United States Patent Office 3,219,239
Patented Nov. 23, 1965

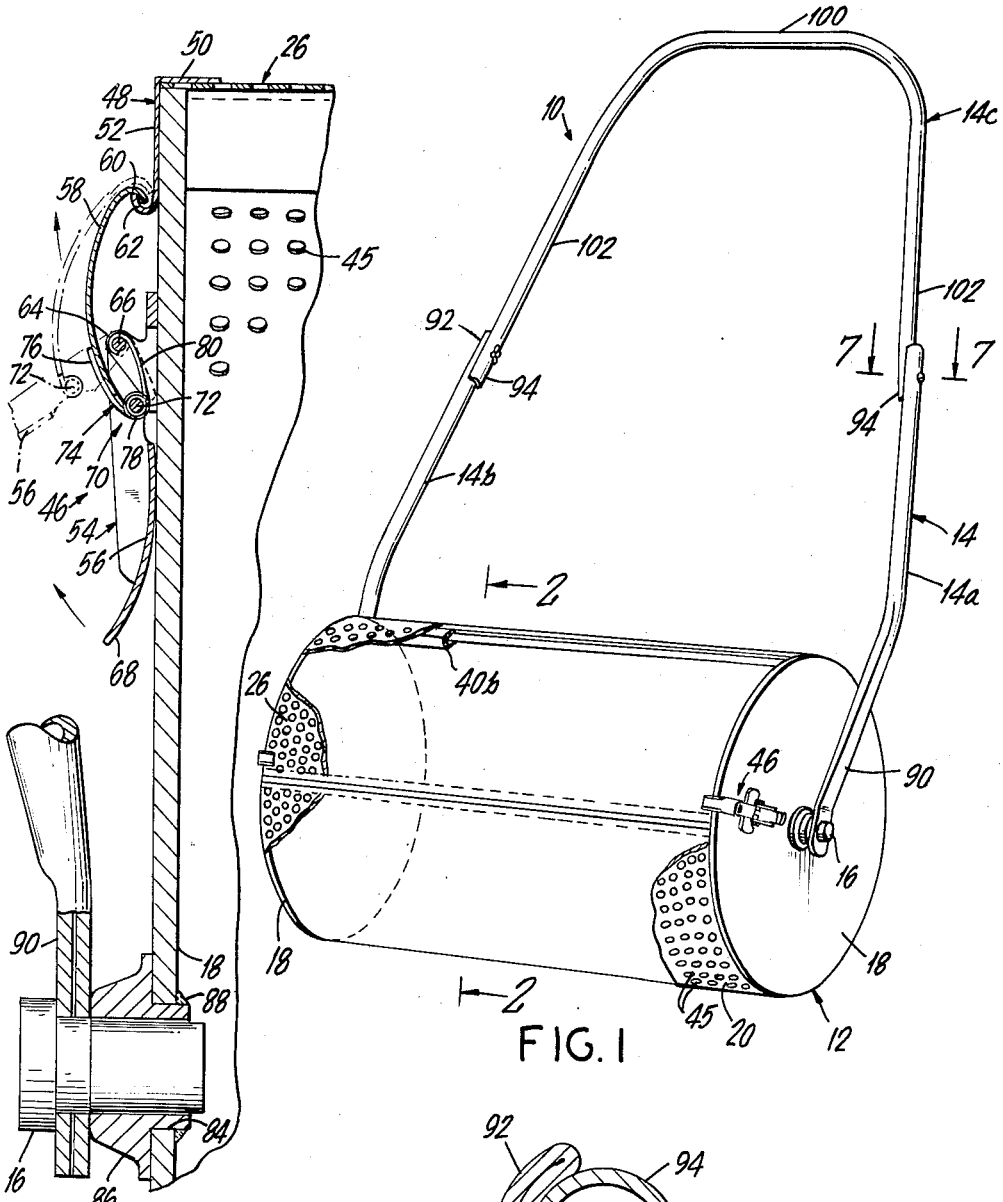
FIG. 1
FIG. 3
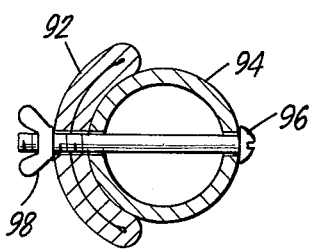
FIG. 7
INVENTOR.
ROBERT T. WATRAL
BY Felshin and Rosen
ATTORNEYS.

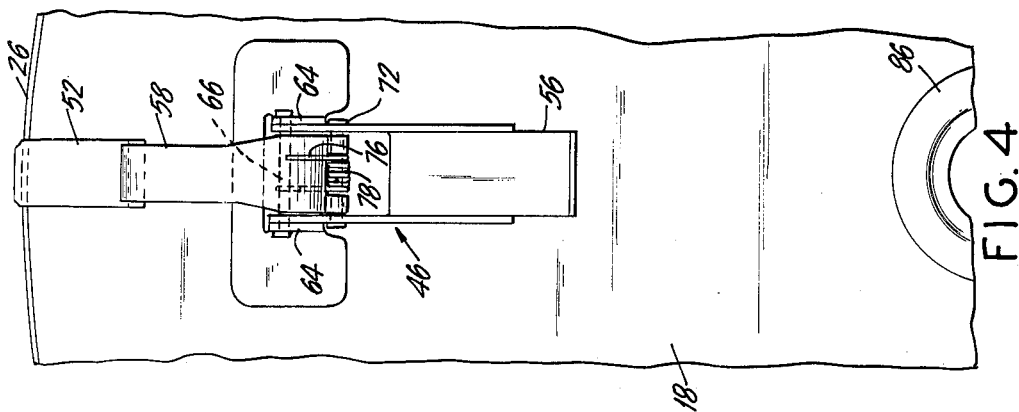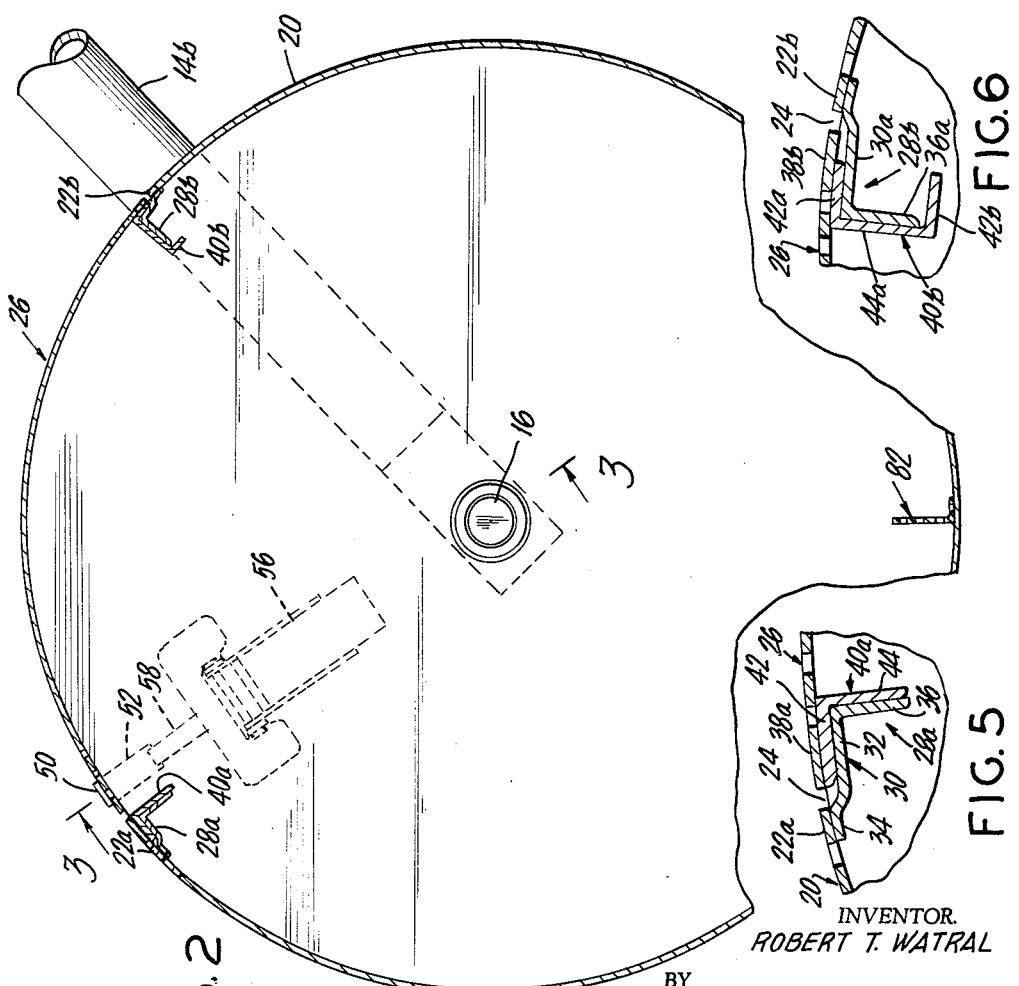

3,219,239
APPARATUS FOR SCREENING AND SPREADING
LOOSE MATERIAL, ESPECIALLY SOIL
Robert T. Watral, Suffern, N.Y., assignor to Artwire
Creations, Inc., Suffern, N.Y., a corporation of New
York
Filed Aug. 1, 1963, Ser. No. 299,342
9 Claims. (Cl. 222—169)

This invention relates to apparatus for screening and spreading loose material, especially soil.

An object of the present invention is to provide improved apparatus for screening loose material and simultaneously spreading the screened material as an even layer of fine material. The apparatus is especially useful as a top soil screener and spreader for evenly distributing a layer of fine top soil as a cover or dressing for newly sown seeds.

A further object is to provide apparatus of the type indicated, including a rotary hollow container for the loose material for rolling along the ground, with improved means for providing access to the interior of the container in a manner which does not interfere with the rolling action of the container.

Another object is to provide the above indicated container with means for both supporting a closure member for the access opening of the container and for breaking up large pieces or clumps of material.

The above and other objects, features and advantages of the invention will be more fully understood from the following description of the invention considered in connection with the accompanying illustrative drawings in which:

FIG. 1 is a perspective view of a screener and spreader in accordance with the invention, with portions cut-away for the purpose of illustration;

FIG. 2 is a cross section, on a larger scale, taken on line 2—2 of FIG. 1;

FIG. 3 is a sectional view, on a larger scale, taken on line 3—3 of FIG. 2;

FIG. 4 is a partial end view of the roller end of the apparatus showing the clamping means for clamping the cover to the container of the apparatus;

FIG. 5 is a detailed cross sectional view of parts of the container with its cover in a closed position and taken at the opening longitudinal edge of the cover;

FIG. 6 is a detailed cross sectional view of the parts of the container with its cover in a closed position and taken at the opposite or hinge longitudinal edge of the cover; and FIG. 7 is a cross section, on a larger scale, taken on line 7—7 of FIG. 1.

Referring now to the drawings in detail, the screener and spreader 10 comprises a rotary hollow cylindrical container 12 for loose material, for example soil, and a handle 14 which is connected to the container and is operable to rotate the container by pushing or pulling on the handle, which causes the container to rotate on the handle support pins 16 as the container is moved along the ground on which it rests.

The container comprises a pair of longitudinally spaced end walls 18 which are in the form of flat circular discs. A perforated circular-shaped main wall sheet member 20 extends from one end wall to the other and, as best seen in FIGS. 1 and 3, the ends of the main wall encircle the circumferential edge of the companion end wall and are suitably secured thereto, as by welding. Wall 20, in cross section, is in the form of an arc of a circle, and therefore has circumferential spaced longitudinal edges 22a and 22b (FIG. 2) which are spaced about 90° from each other to form an access opening 26. It is to be understood that the access opening extends longitudinally from the inner surface of one end wall 18 to the opposite end wall to provide a substantially large area for easy access to the interior of the container.

The access opening is closed during operation of the apparatus by a perforated cover 26. To support the cover in its closed position on the main wall, longitudinal edge 22a is provided with a longitudinally extending cover support angle 28a. The angle extends between end walls 18, and one flange 30 of the angle (FIG. 5) has a cover support part 32 which is inwardly offset from the remaining marginal edge portion 34 of the flange. Portion 34 is connected as by spot welding, to the undersurface of wall 20, adjacent longitudinal edge 22a, and the cover support part 32 of the angle extends therefrom toward the opposite edge 22b of the main wall. Remaining flange 36 of the angle extends radially inwardly toward the longitudinal axis of the container for a purpose which will be more clearly understood hereinafter. Longitudinal edge 22b of the main wall is also provided with a cover support angle 28b (FIG. 6) which is identical to support angle 28a but is positioned oppositely thereto so that the angles extend toward each other.

The closing edge 38a of cover 26 is provided with a longitudinally extending angle 40a which cooperates with angle 28a to support the closing edge of the cover in its closed position. Angle 40a comprises a flange 42 that rests on cover support part 32 of angle 28a, and a flange 44 that projects radially inwardly toward the longitudinal axis of the container and is in engagement with flange 36 of angle 28a in the closed position of the cover. Flanges 36 and 44 provide a baffle which extends radially inwardly toward the axis of the container to aid in breaking up clumps of material or soil. It is to be noted that the amount of inward offset of part 32 with respect to portion 34 of angle 28a is such as to accommodate the thickness of flange 42 so that the outer surfaces of main wall 20 and cover 26 are coextensive, since the thicknesses of the main wall and cover are the same, whereby the outer surface of the cylinder 12 is smooth, circular and has substantially no projections.

The opposite or hinge edge 38b (FIG. 6) of cover 26 is provided with a longitudinally extending channel 40b which functions somewhat like a hinge for the cover. More particularly, the channel comprises a pair of flanges 42a and 42b which are radially spaced from each other and are interconnected by a web 44a. Flange 42a is secured, as by spot welding, to the undersurface of cover 26, slightly spaced from edge 38b thereof, and the channel projects radially inwardly toward the longitudinal axis of the container. Flange 42a rests on leg 30a of angle 28b, in the closed position of the cover, and web 44a is in engagement with or adjacent to flange 36a of the angle with flange 42b extending transversely of the web so that the flanges of the channel straddle angle 28b. In this manner, the hinge edge of the cover is supported on angle 28b and the radially inwardly projecting parts of the channel and angle provide a baffle for breaking up clumps of soil. The outer surfaces of the cover and main wall, adjacent the hinge edge of the cover, are coextensive due to the inwardly offset portion of angle 28b, as previously explained with respect to the closing edge of the cover. The cover has a cross section which is an arc of a circle having the same radius of curvature as the main wall to form therewith, cylinder 12. The circular perforations or holes 45 in the cover and main wall are large enough to permit the soil to pass therethrough while preventing passage of stones and large pebbles.

To mount the cover on the main wall of the container, the hinge edge 38b of the cover is first moved into position so that channel 40b straddles angle 28b and, thereafter, the opposite closing edge 38a of the cover is closed on angle 40a. A releasable spring clamp 46 (FIGS. 1, 3 and 4) is provided at each end of the closing edge 38a of the cover to releasably hold the cover in place on the main wall of the container. Each clamp comprises an L-shaped keeper member 48 having a flange 50 suitably secured, as by spot welding, to the outer surface of the end of the cover, adjacent side edge 38a thereof. The slight projection of flange 50 does not affect the smooth rolling operation of the container. Another flange 52 extends transversely from flange 50 and, in the closed position of the cover, extends radially toward the longitudinal axis of the container and is adjacent the end wall 18 of the container, as best seen in FIG. 3. The end wall carries a releasable latch 54 which comprises a pivoted finger operated member 56 to which is pivotally connected a bowed, slightly flexible, latching member 58 having a hooked end 60 which is adapted to engage the hooked end 62 of keeper member 48. The end wall is provided with a pair of laterally spaced ears 64 which extend outwardly from the end wall and a pivot pin 66 extends between the ears. One end of member 56 is pivotally mounted on the pivot pin and the opposite end of the member is provided with a finger engaging portion 68 which, in the clamped position of the clamp as illustrated in solid lines in FIG. 3, extends outwardly from the end wall to permit ready access thereto.

The end 70 of latching member 58 is pivotally connected to operating member 56 at a position intermediate the end of the operating member and, for this purpose, the operating member is provided with a pivot pin 72 which is laterally offset from pin 66 so that in the clamped position of the clamp, as seen in FIG. 3, pin 66 is spaced outwardly of pin 72. A torsion spring 74 has one of its arms 76 engaging latching member 58. The coiled part 78 of the spring encircles pin 72 and the other arm 80 of the spring encircles the pin 66, so that latching member 58 is normally biased toward the end wall.

To releasably clamp the cover in position, the hooked end 60 of latching member 58 is positioned, with respect to hooked end 62 of keeper member 48, as shown in dot-dash lines in FIG. 3, due to the mounting of the cover on the main wall of the container. As shown, pivot pin 72 is considerably spaced to the left of pivot pin 66. Movement of operating member 56 toward the end wall results in downward movement of hooked end 60 of the latching member to engage hooked part 62 of the keeper member and, concomitantly, tensioning the bowed latching member which, as pivot pin 72 moves toward the right of pivot pin 66, causes operating member 56 to snap into locked position against the wall, as shown in solid lines in FIG. 3. Opposite movements unlatch the clamp.

The container is provided with another baffle member 82 (FIG. 2) which comprises an L-shaped perforated sheet member that extends longitudinally between the end walls of the container, about midway between the first mentioned pair of baffles and opposite the latter. The baffle member is suitably secured, as by spot welding, to the inner surface of the main wall, and projects radially inwardly toward the longitudinal axis of the container.

As indicated previously, the container is mounted for rotation on pins 16 of the handle. For this purpose, the end walls 18 are provided with longitudinally axially aligned mounting holes 84 (FIG. 3), through which extends a journal bearing 86 that is welded to the inner surface of the end wall as indicated at 88.

The handle preferably is in three sections for simplicity in shipping. Sections 14a and 14b are identical and each comprises a tube having a pin carrying flattened, inwardly extending end section 90 and an opposite end section 92 which, as best seen in FIGS. 1 and 7, is collapsed to conform to the circular end 94 of the remaining tubular section 14c of the handle. A screw 96 and wing nut 98 hold the sections together. Section 14c of the handle has a tubular cross bar 100 interconnecting the side tubular arms 102 which provides a hand grip which is grasped by the operator to roll container 12 along the ground. Arms 102 and connected sections 14a and 14b form resilient side members which are biased toward each other, in the attached position of the handle, so that pins 16 remain in bearings 86.

Furthermore the perforated sheet closure member can be opened and closed so easily by said clamps, that the apparatus can be filled and unfilled without lifting the cylinder or undue exertion.

To unload the apparatus, remove the closure member when same is in the top position then rotate the cylinder one-half turn and the unscreened material falls out, leaving the cylinder clean.

Then the cylinder is rotated again one-half turn so that the access opening is at the top and the cylinder is again ready to be refilled. To rotate cylinder, simply push or pull on the handle, and the cylinder rotates itself.

While I have shown and described the preferred embodiment of the invention, it will be understood that the invention may be embodied otherwise than as herein specifically illustrated and described, and that certain changes in the form and arrangement of parts and in the specific manner of practicing the invention may be made without departing from the underlying ideas or principle of this invention within the scope of the appended claims.

I claim:

1. In combination, a rotary hollow cylindrical container comprising a pair of longitudinally spaced end walls and a perforated circular-shaped main wall sheet member extending between said end walls and having a pair of spaced longitudinal edges forming an access opening, closure means for closing said access opening, said closure means comprising a perforated sheet closure member having the same curvature as said main wall sheet member and having a pair of longitudinal edges spaced from each other a distance corresponding to the distance between said longitudinal edges of said main wall sheet member, each of said longitudinal edges of said main wall sheet member having closure support means in engagement with companion means therefor on the corresponding longitudinal edges of said closure means for supporting said closure means in the closed position thereof, clamp means for releasably holding said closure means in said closed position thereof, and handle means secured to said container for moving the latter, wherein said closure support means on one of said longitudinal edges of said main wall sheet member comprises an angle member and said companion means therefor on said corresponding longitudinal edge of said closure means comprises a channel member having its opposite flanges straddling said angle member.

2. The combination of claim 1, wherein the other closure support means on said other longitudinal edge of said main wall sheet member comprises an angle member, and the other companion means therefor on the other corresponding longitudinal edge of said closure means comprises an angle member with the flanges of one engaging the flanges of the other, respectively.

3. In combination, a rotary hollow cylindrical container comprising a pair of longitudinally spaced end walls and a perforated circular-shaped main wall sheet member extending between said end walls and having a pair of spaced longitudinal edges forming an access opening, closure means for closing said access opening, said closure means comprising a perforated sheet closure member having the same curvature as said main wall sheet member and having a pair of longitudinal edges spaced from each other a distance corresponding to the distance between said longitudinal edges of said main wall sheet member, each of said longitudinal edges of said main wall sheet member having closure support means in engagement with companion means therefor on the corresponding longitudinal edges of said closure means for supporting said closure means in the closed position thereof, clamp means for releasably holding said closure means in said closed position thereof, and handle means secured to said container for moving the latter, wherein said clamp means comprises a keeper member on said closure means and a latch member on said end wall in position to releasably engage said keeper member when said closure means is in said closed position thereof.

4. The combination of claim 2, wherein said main wall sheet member and said closure means, in said closed position thereof, have outer surfaces which are coextensive with each other.

5. In combination, a rotary hollow cylindrical container comprising a pair of longitudinally spaced end walls and a perforated circular-shaped main wall sheet member extending between said end walls and having a pair of spaced longitudinal edges forming an access opening, closure means for closing said access opening, said closure means comprising a perforated sheet closure member having the same curvature as said main wall sheet member and having a pair of longitudinal edges spaced from each other a distance corresponding to the distance between said longitudinal edges of said main wall sheet member, each of said longitudinal edges of said main wall sheet member having closure support means in engagement with companion means therefor on the corresponding longitudinal edges of said closure means for supporting said closure means in the closed position thereof, clamp means for releasably holding said closure means in said closed position thereof, and handle means secured to said container for moving the latter, wherein said handle means carries a pair of spaced, axially aligned pins, and said end walls of said containers carry journal bearings, said pins being mounted in said journal bearings, respectively.

6. A spreader and screener comprising a member having coaxial circular end walls interconnected by a major part cylindrical perforated wall, providing an access opening, a minor part cylindrical closure for said opening, complementary to said major circular wall, means to attach said closure to said member, said end walls having coaxial openings, a handle straddling said member and having axles removably, rotatably and axially engaging said end walls, said attaching means comprising clamps on said end walls and means on said closure releasably engaged by said clamps, and said closure being removable upon releasing said clamp means.

7. The combination of claim 6, said minor wall being perforated.

8. A spreader and screener comprising a member having coaxial circular end walls interconnected by a major part cylindrical perforated wall, providing an access opening, a minor part cylindrical closure for said opening, complementary to said major circular wall, means to attach said closure to said member, said end walls having coaxial openings, a handle straddling said member and having axles removably, rotatably and axially engaging said end walls, the major wall at one longitudinal end and said minor wall at an adjacent longitudinal end, having longitudinal disengageable, pivotally inter-engaging means, and at their other longitudinal adjacent ends, having longitudinal mutually contacting portions, said attaching means comprising clamp members on said end walls and means adjacent said other end of said minor wall releasably engageable by said clamp members for clamping said closure to said member.

9. The combination of claim 8, and longitudinal baffle means projecting inwardly from at least one of said longitudinal walls.

References Cited by the Examiner
UNITED STATES PATENTS

| | | | |
|---|---|---|---|
| 313,015 | 1/1885 | Nobles | 222—169 X |
| 1,925,809 | 9/1933 | Masters | 222—169 X |
| 2,751,123 | 6/1956 | Kuhles et al. | 222—176 |

LOUIS J. DEMBO, *Primary Examiner.*

RAPHAEL M. LUPO, *Examiner.*